Figure 1:
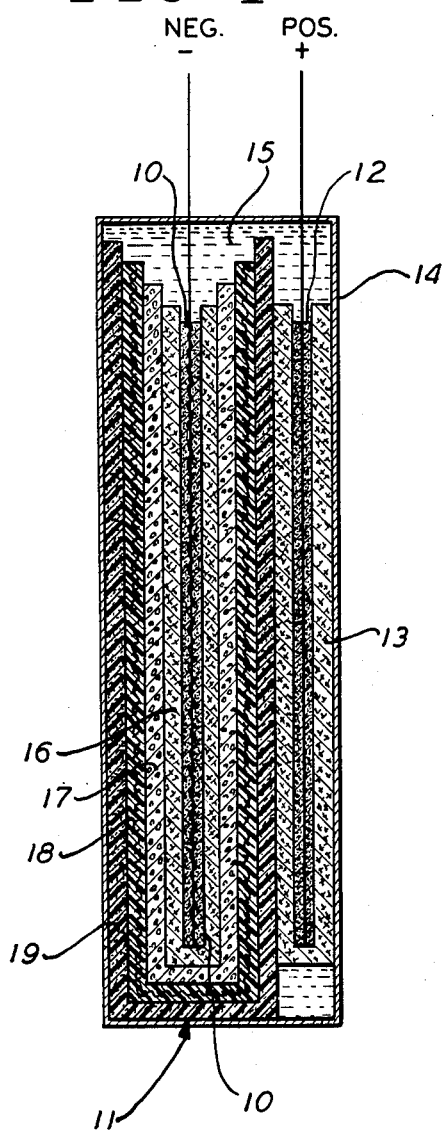

United States Patent [19]

Steffensen

[11] 3,970,472
[45] July 20, 1976

[54] RECHARGEABLE BATTERY WITH ZINC NEGATIVE AND DENDRITE BARRIER

[75] Inventor: John Steffensen, West Caldwell, N.J.

[73] Assignee: McGraw-Edison Company, Elgin, Ill.

[22] Filed: July 8, 1975

[21] Appl. No.: 593,965

[52] U.S. Cl. .................................. 136/3; 136/145
[51] Int. Cl.² ................... H01M 43/02; H01M 3/00
[58] Field of Search .............. 136/30, 31, 145, 146, 136/143, 147, 131, 132, 102, 167

[56] References Cited
UNITED STATES PATENTS

| | | | |
|---|---|---|---|
| 3,013,099 | 12/1961 | Mendelsohn........................ | 136/146 |
| 3,207,630 | 9/1965 | Solomon et al.................... | 136/30 X |
| 3,497,387 | 2/1970 | Amiet................................ | 136/30 |
| 3,669,746 | 6/1972 | Devitt et al. ...................... | 136/30 X |
| 3,764,387 | 10/1973 | Stark............................... | 136/30 X |

*Primary Examiner*—Anthony Skapars

[57] ABSTRACT

A rechargeable battery having a zinc negative electrode, and a positive electrode preferably of nickel hydroxide, is provided with a novel dendrite barrier to prevent zinc spurs growing out of the zinc electrode during charge and shorting the battery. A novel separator pocket, which includes the barrier and is adapted to confine the zinc negative electrode against shape change, comprises an inner wrap of an absorbent film, an intermediate wrap of a microporous film, a next adjacent wrap of the flexible dendrite barrier, and an outer wrap pf a cellulosic film. This improved barrier is a porous, flexible sheet material comprising a substrate of a flexible, porous cloth woven from random fiber polypropylene in and through which is deposited a porous metal having a low hydrogen overvoltage to oxidize the zinc dendrites on contact in an alkaline electrolyte. The barrier in this multiple wrap allows free flow of ions and free escape of evolved hydrogen; and prevents any dendrites from passing therethrough and penetrating the outer cellulosic film.

In rechargeable batteries using zinc negative electrodes such as of pasted plates in an alkaline electrolyte, the zinc electrode limits the cycle life of the battery because of (1) an effective loss of zinc through shape change and through shedding and dissolution of the zinc in the electrolyte, and (2) a shorting of the battery electrodes by growth of zinc dendrites during charging.

12 Claims, 2 Drawing Figures

—ZINC ELECTRODE 10
—ABSORBANT WRAP 16
—MICROPOROUS WRAP 17
—BARRIER WRAP 18
—CELLULOSIC WRAP 19

U.S. Patent    July 20, 1976    3,970,472

- ZINC ELECTRODE 10
- ABSORBANT WRAP 16
- MICROPOROUS WRAP 17
- BARRIER WRAP 18
- CELLULOSIC WRAP 19

RECHARGEABLE BATTERY WITH ZINC NEGATIVE AND DENDRITE BARRIER

The present invention copes with the loss of zinc by using small quantities of electrolyte and by confining the zinc in the dicharged state (zinc oxide) as a solid material at the current collector. This confinement of the zinc is accomplished by encapsulating the zinc electrode in a tight, multiwrap separator pocket. This separator pocket diffuses the electrolyte but not the zinc. The small quantity of zinc oxide which goes into solution is, during charging, reduced to zinc at the current collector. Additionally, shape change and loss of zinc may be impeded by a zinc electrode construction wherein zinc active material is packed under pressure in perforated metal strip pockets as taught by the pending Enters Application Ser. No. 518,091, filed Oct. 25, 1974.

The shorting of the battery by zinc dendrites during charging remains a problem because these dendrites are fine spurs which grow out from the electrode to penetrate the separator walls. When the outer cellulosic confining wall of the pocket is penetrated there is a potential shorting of the battery and also a leakage from the pocket, allowing escape of zincate ions. Heretofore, separator wraps using the best of separator materials have provided for only a limited number of charge-discharge cycles of zinc-nickel cells before the wraps are penetrated by dendrite growths and consequent loss of zinc and ultimate shorting of the battery.

An approach towards preventing shorting of zinc-nickel cells by dendrite growth is to provide an auxiliary electrode which on contact with zinc dendrites in "alkaline electrolyte will oxidize the dendrites into the solution with release of hydrogen. This approach is best described in a paper entitled: "A Rechargeable Nickel-Zinc Cell with Auxiliary Electrode," by Gabor Benczur-Urmossy et al, given at the International Power Sources Conference at Brighton, England, Sept. 1974. This paper describes the auxiliary electrode as being separated by a single microporous layer and as comprising "a nickel mesh whose surface is covered by an electrocatalyst for hydrogen evolution and which extends beneath the zinc anodes and is provided with a separate current lead . . ." As to the type of mesh, it is stated: "A 100-mesh netting has proved sufficiently narrow for this purpose and wide enough for rapid hydrogen bubble liberation." It is further described that the zinc electrode has a higher charge efficiency than the nickel electrode, requiring an equalization of charge efficiencies of the two electrodes and a suppression of shape change of the zinc electrode, and that this "is effected by short-circuiting the auxiliary electrode with the zinc electrodes after the cell has been fully discharged" to discharge fully the zinc electrode. It is also stated that: "Any zinc remaining on the anode base plates due to . . . exhaustion of cathode capacity is removed by this residual discharge."

The present invention distinguishes from the prior art by use of a novel barrier which operates by local action without requiring any outgoing leads and by providing the barrier as part of a multilayer separator pocket which encapsulates the electrode to prevent penetration of the wrap by dendrites. Thus, the integrity of the wrap is preserved against leakage of zincate ions and against shorting of the cell. This new barrier comprises a cloth substrate woven of a porous material and impregnated with porous nickel formed from a nickel powder of irregularly-shaped nickel particles. This barrier is characterized by a high degree of porosity to allow free flow of ions and free escape of evolved hydrogen gases while yet providing multitudinous sites where zinc dendrites will be oxidized and destroyed before penetrating the barrier. Tests have shown that this new barrier has a markedly superior performance in restricting dendrite growths to the separators of the prior art.

It is an object to provide a rechargeable alkaline electrolyte battery with a zinc negative electrode which has a markedly greater cycle life than has been heretofore obtainable.

It is another object to provide such rechargeable battery with a novel dendrite barrier which is more effective than are the separators for this purpose heretofore provided.

It is another object to provide such dendrite barrier in the form of a flexible sheet capable of being used as a wrap around the zinc electrode without exposing sharp corners which might pierce the other separator layers.

It is another object to provide such flexible barrier of a composition comprising a flexible cloth substrate of porous material in and through which is deposited a metal in a porous state having a low hydrogen overvoltage.

It is a further object to provide a multilayer, flexible wrap of separator materials sealed into a pocket form to encapsulate the zinc electrode against shape change and loss of zinc of which an intermediate layer is constituted by the present dendrite barrier to prevent perforating of the outer confining layer of the wrap by dendrite growths.

These and other objects and features of the invention will be apparent from the following description and the appended claims.

Figure 2:
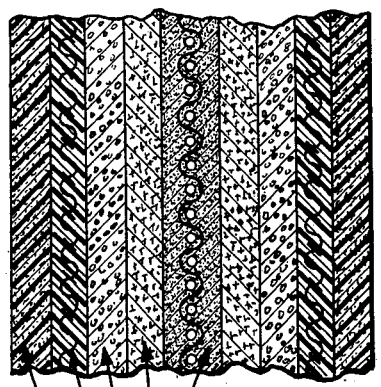

In the description of the invention reference is had to the accompanying drawings, of which:

FIG. 1 is a diagrammatic showing of the negative and positive electrodes of a nickel-zinc cell showing the present multilayer wrap forming a separator pocket for the zinc negative electrode; and FIG. 2 is a fractional view with legends showing the successive layers of materials of this pocket.

The substrate for the present dendrite barrier is a stable, open-weave cloth of a porous material in the form of random fiber polypropylene, known commercially as Webril 1451, produced by the Fiber Products Division of Kendall Corporation. This cloth is impregnated with a metal powder having a low hydrogen overvoltage. Nickel is a preferred metal, but other metals such as iron, platinum, palladium, chromium, silver and manganese are also operable. The impregnation may be carried out by any method which will produce a porous metal layer and retain the permeability and porosity of the substrate. A vapor deposition of metal may be employed as one method, but preferably the porous metal is affixed to the substrate by use of a porous cement. The advantage of using the Webril 1451 for the substrate is that the fibers are close enough to distribute and retain metal during filtration, is porous enough to absorb electrolyte and thus avoid excessive resistance in the cell, and is permeable enough to allow evolved hydrogen to escape from the barrier.

A satisfactory porous cement for the present purpose is produced by dissolving 0.5-5%, preferably 2%, by weight of a modified acrylic plastic in a solvent of tetrahydrofuran, this plastic being preferably that produced by American Cyanamid Corporation as MP 20. To this solution is added nickel powder in an amount of 0.1 to 10 grams, preferably 2 grams per 100 cc of solution to form a slurry. This slurry is filtered through the cloth substrate causing a layer of nickel wetted by the 2% cement solution to be deposited on and through the substrate to form a pad. Before the tetrahydrofuran is evaporated, the pad is washed with water to remove the tetrahydrofuran, leaving a porous plastic which cements the nickel powder to the cloth substrate. The porous nickel which is so formed is fully available for contact with the zinc dendrites to provide for their resulting oxidation. In other words, a dendrite cannot penetrate through the pad without contacting one or another of multitudinous nickel sites and becoming destroyed.

Nickel powder is a preferred barrier metal not only because it has a low hydrogen over-voltage to oxidize zinc metal on contact in an alkaline electrolyte, but also because it is available in a fine powder of irregularly-shaped particles having a high surface-to-volume ratio as represented, for example, by the powder Type 255 of the International Nickel Company.

The cement solution requires the use of soluble plastics which are stable in alkaline electrolyte under cell conditions. Tetrahydrofuran has been chosen for the solvent because it is water-soluble, and MP 20 plastic has been chosen for the plastic cement because it is precipitated from solution by addition of water. Other solvents which may be used include acetone, methylene, chloride, dichlorethylene and trichlorethylene. Other plastics include the acrylics and polystyrenes.

Alternatively, the barrier metal particles may be incorporated in the porous fiber backing forming the substrate either as part of the fibers or by trapping the same within the fibers during the manufacturing of the cloth or felt.

The novel dendrite barrier abovedescribed is employed to optimum effectiveness in zinc-nickel cells when it is used as a layer with other separator layers each completely encasing the zinc electrode to form a multilayer pocket tightly encapsulating the electrode. In the cell construction shown in the Figures, there is a zinc negative electrode 10 as of the conventional type comprising a paste of zinc active material on a conductive metal screen, or of the secondary type described in the Enters application aforementioned. This electrode is encased in a separator pocket 11. The cell is housed in a case 14 with an alkaline electrolyte 15 preferably of potassium hydroxide which is confined principally in the absorbent wraps adjacent the electrodes.

The preferred separator construction comprises an inner absorbent layer as of cotton, polyamides, or preferably of nylon felt sold under the name of Pellon 2,505 by the Pellon Corporation. This absorbent layer is wrapped around the electrode and is followed by a second wrap of a microporous material to distribute dendrite growth, a preferred microporous material being porous polypropylene sold under the name "Celgard" by the Celanese Corporation. Applied next around the microporous separator is the flexible nickel porous barrier 18 of the present invention. These two separators and barrier are then wrapped with a layer 19 of a cellulosic confining material such as PUD-O-193 cellophane produced by E. I. DuPont DeNemours Co.

Although cellophanes have been the most restrictive separator to impede dendrite growth to date, the present nickel barrier has proven superior to five layers of cellophane by a factor of 5 and more. Tests made to evaluate zinc dendrite growth through different separator materials during charging are those provided by Dalin and Solomon, as described in the article: "Characteristics of Separators for Alkaline Silver Oxide Zinc Secondary Batteries," edited by J. E. Cooper and A. Fleischer and published in U.S.A.F. Manual of 1964. By this test method the time during charge is recorded until a sudden drop in voltage occurs between the zinc electrode and a platinum reference electrode during constant charging to indicate that a short has developed. The shorting time of the electrodes separated by the sample material relative to that of a standard cellophane has been designated as the "Zinc Stopping Factor." The Zinc Stopping Factor divided by the wet thickness in mils of the sample material is known as the "Merit Factor." This test measures the time in minutes during constant charging of the zinc electrode at a current density of 0.051 amperes per square inch until a short develops between the zinc electrode and the platinum third electrode. The electrolyte comprises 45% potassium hydroxide solution containing 76.5 grams of zinc oxide per liter. The shorting time divided by that of a standard separator material of unplasticized cellophane, Grade PUD-0-193 of the DuPont Company, is the reference for the "Zinc Stopping Factor," The ratio of this Zinc Stopping Factor to the thickness of the material under test is the "Merit Factor."

The following table shows the results of these tests:

| Separator | Shorting Time Minutes | Wet Thickness | Stopping Factor | Merit Factor |
|---|---|---|---|---|
| PUD-O-193 (Standard) 1 Layer | 178 | .0028 | 1.00 | 0.36 |
| PUD-O-193 2 Layers | 656 | .0048 | 3.69 | 0.77 |
| PUD-O-193 5 Layers | 2403 | .0158 | 13.50 | 0.85 |
| Fibrous Casing | 1041 | .0088 | 5.85 | 0.66 |
| Celgard | 211 | .0055 | 1.19 | 0.22 |
| Fibrous Casing Nickel Barrier Celgard | 19860 | .0177 | 111.6 | 6.30 |
| PUD-O-193 (2 Layers) Nickel Barrier Celgard | 16980 | .0161 | 95.4 | 5.93 |

The above table shows that available separators of cellophanes, fibrous casing and Celgard have respective Merit Factors of less than 1. The addition of the present nickel barrier increases the Merit Factor to over 6. This represents a very marked improvement in combating zinc dendrite growth to prevent shorting of batteries with zinc negative electrodes during charging and in increasing correspondingly the cycle life of these batteries.

The embodiment of my invention herein shown and described is intended as being illustrative and not necessarily limitative of my invention since the same is subject to changes and modifications without departure from the scope of my invention, which I endeavor to express according to the following claims.

I claim:

1. In a rechargeable battery having an alkaline electrolyte, and zinc-negative and positive electrodes wherein dendrite growths from the zinc electrode during charge tend to short the battery: a dendrite barrier across the entire face of the zinc electrode including a porous absorbent layer between the zinc electrode and the barrier and a confining separator layer across the outer face of the barrier capable of diffusing the electrolyte but not the dissolved zinc, said barrier comprising a cloth substrate of a porous flexible material, and porous metal deposited on and through said substrate of a low hydrogen over-voltage which on contact with a zinc dendrite reacts with the same to dissolve the dendrite and prevent the same from shorting the adjacent electrode.

2. The battery set forth in claim 1 wherein the barrier layer is a flexible wrap completely surrounding the zinc electrode.

3. The battery set forth in claim 2 wherein the confining layer is a cellulosic wrap completely surrounding the barrier wrap.

4. The battery set forth in claim 1 including a microporous layer between said absorbent layer and said barrier to distribute dendrites wherein said layers are successive wraps forming a multilayer separator pocket completely encapsulating the zinc electrode in a tight wrap relationship to retard shape change.

5. The battery set forth in claim 4 wherein the positive electrode is adjacent said separator pocket including a single absorbent layer of a separator material between the positive electrode and said pocket.

6. The battery set forth in claim 1 wherein said zinc-negative electrode comprises a plurality of perforated metal strip pockets seamed along the edges into a plate structure, said pockets being filled with zinc active material and being compressed to retain the active material in place and in close electrical contact with the perforated metal strips.

7. The battery set forth in claim 1 wherein said substrate of said barrier comprises a cloth woven of random fiber polypropylene.

8. The battery set forth in claim 1 wherein said barrier metal is a layer of fine nickel powder of irregularly-shaped particles integrated into a porous self-sustaining coating on said substrate.

9. The battery set forth in claim 8 including a porous plastic cement securing said nickel powder into a porous self-sustaining coating onto said substrate.

10. The battery set forth in claim 3 wherein said dendrite barrier is wholly confined by said wrap of cellulosic material without any current lead connection whereby the barrier is operative only by local action without external current flow between it and the battery electrodes.

11. A multilayer separator pocket for the zinc-negative electrode of an alkaline-electrolyte nickel-zinc cell comprising a first inner layer of a porous material adjacent to the zinc electrode to absorb electrolyte, a microporous separator layer against the absorbent layer to distribute dendrites, a flexible porous dendrite barrier layer against the microporous layer including a porous metal of low hydrogen over-voltage capable of dissolving dendrites on contact therewith in an alkaline electrolyte, and an outer confining cellulosic layer against said dendrite barrier capable of diffusing electrolyte but not dissolved zinc.

12. The separator pocket set forth in claim 11 wherein said dendrite barrier comprises a porous substrate of a woven cloth having a porous coating thereon and cemented thereto of a metal powder with a low hydrogen over-voltage.

* * * * *